Sept. 17, 1929.  C. O. BROWN  1,728,197
STORING MATERIAL
Filed May 24, 1927
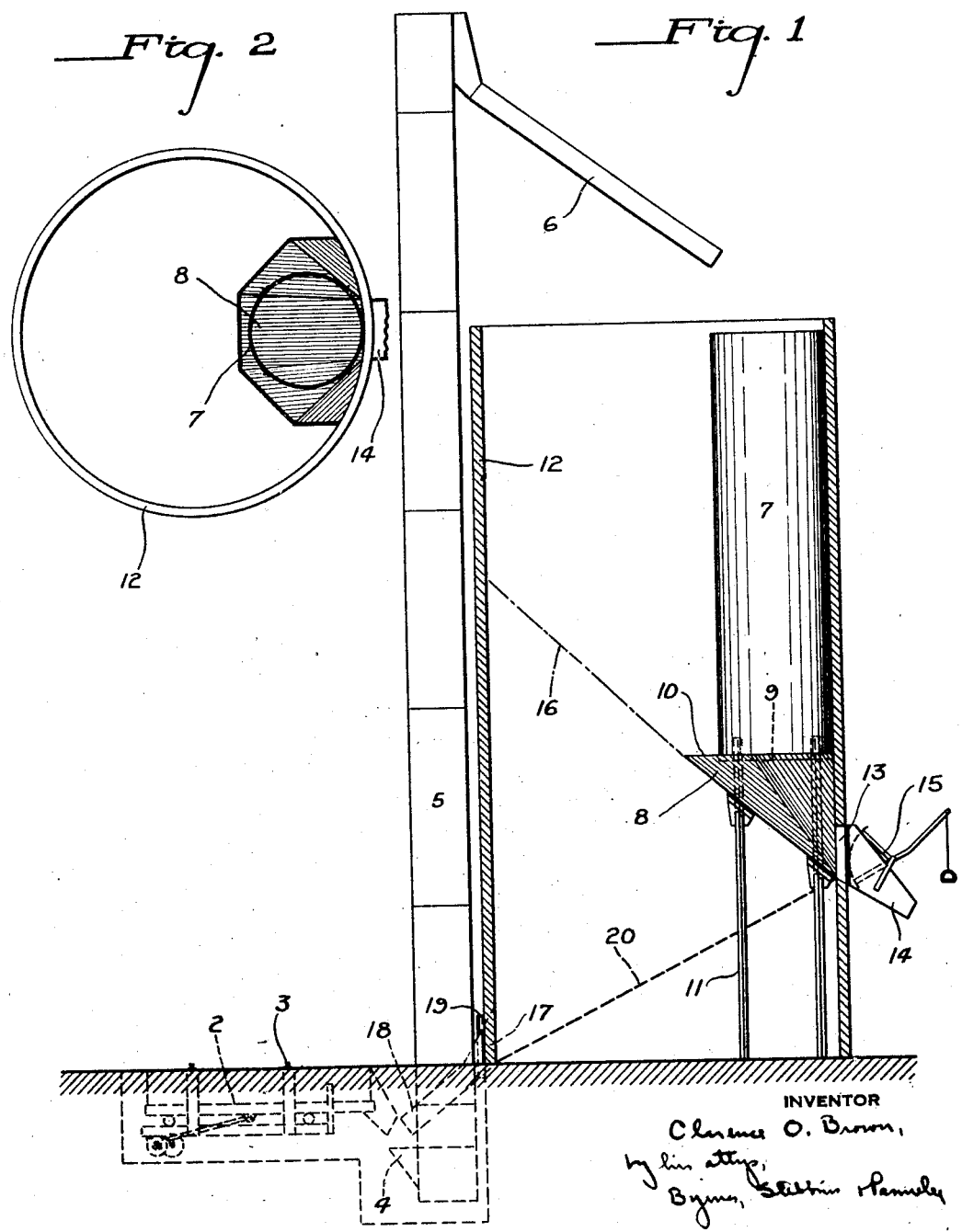
INVENTOR
Clarence O. Brown, Patented Sept. 17, 1929.

1,728,197

UNITED STATES PATENT OFFICE

CLARENCE O. BROWN, OF MARION, OHIO, ASSIGNOR TO THE FAIRFIELD ENGINEERING COMPANY, A CORPORATION OF OHIO

STORING MATERIAL

Application filed May 24, 1927. Serial No. 193,801.

This invention relates to the storing of materials, and is herein particularly described as embodied in a storage unit for coal or the like.

Many coal storage installations require a live storage bin or container at such an elevation that its contents can be discharged by gravity into a truck, a stoker hopper or the like. At the same time it is uneconomical to provide overhead storage for all of the coal which it is desired to keep on hand. Dead storage space, usually commencing at ground level, is therefore sometimes provided together with means for elevating coal from the dead storage container when it is to be used.

I provide a live storage container, a dead storage container and an outlet for the live storage container, the live storage container having an opening communicating with the dead storage container whereby at least a portion of its contents may be discharged directly through the live storage container outlet. Preferably I employ a bin or silo having a live storage container therein. The live storage container preferably takes the form of a hopper surmounted by an open-ended shell. An opening is provided between the shell and the lip of the hopper so that material in the main bin or silo may flow over the lip of the hopper, and thus to the outlet for the unit. An elevator for supplying material to the unit is provided, this elevator being arranged to discharge to the open-ended shell so that live storage is always provided first. When the shell is filled, the overflow goes to dead storage. Means is provided at the bottom of the main storage bin for returning material to the elevator.

In the accompanying drawings, which illustrate the present preferred embodiment of my invention as applied, for example, to a coal yard installation, Figure 1 is a side elevation partly in section, and Figure 2 is a top plan view of the storage containers.

In the drawings there is shown a feeder 2 under a railroad track 3. The feeder is arranged to receive material from the hopper bottom cars on the tracks 3 and to discharge into the boot 4 of a vertical elevator 5. The elevator 5 has a discharge chute 6 terminating above a cylindrical shell 7. The shell 7 is open at both ends, but is located above a hopper 8, which is of greater cross-sectional area at the top thereof than the cross-sectional area of the shell, so as to provide an open space between the shell and the top of the upper edge of the hopper. The lower edge 9 of the shell terminates a short distance below the lip 10 of the hopper. The hopper and shell are supported from the ground by legs 11, and lie adjacent one wall of a main storage silo 12. A portion of the silo wall forms one side of the hopper 8 and is provided with an opening 13 outside which lies a discharge chute 14 having a hand controlled gate 15.

Material discharged from the chute 6 falls through the shell 7 into the hopper 8. It builds up in the hopper and then in the shell 7, but does not overflow the lip of the hopper, due to the fact that the lower edge 9 of the shell 7 is located below the lip. The shell 7 and the hopper 8 constitute the live storage space, and the material therein may be discharged by actuating the hand controlled valve 15.

When the shell 7 is filled, the material thereafter discharged from the chute 6 overflows the upper edge of the shell 7 and falls into the main storage bin 12. The bin 12 provides a large reserve capacity and may be filled to any height desired.

In Figure 1 there is indicated by a chain line 16 the angle of repose of the material. This line is extended from the lip 10 of the hopper 8. Any material above this line is free to flow through the space between the lower edge 9 of the shell 7 and the lip 10 of the hopper 8. The space above the line 16 therefore constitutes a storage chamber from which material may be discharged without further handling. Live storage apparatus capable of holding large or small quantities of material for gravity discharge is thus provided at low expense.

The space below the line 16 constitutes dead storage. It is discharged through an opening 17 leading to a chute 18 having a gate 19 therein, and arranged to discharge into the boot 4. If desired, the floor of the silo 12 may be inclined as indicated at 20, to make the silo self-clearing.

While I have illustrated and described a preferred embodiment of my invention, it will be understood that it may be otherwise embodied within the scope of the following claims.

I claim:—

1. A storage unit comprising a storage container, a hopper mounted therein above the bottom of the container, and an open-ended shell above the hopper, there being an open space between the shell and the lip of the hopper, the lower edge of the shell terminating below the lip of the hopper.

2. A storage unit comprising a storage container, a hopper mounted therein above the bottom of the container, an open-ended shell above the hopper, there being an open space between the shell and the lip of the hopper, and a discharge for the hopper extending through a wall of the container.

3. A storage unit comprising a storage container, a hopper mounted therein above the bottom of the container, an open-ended shell above the hopper, there being an open space between the shell and the lip of the hopper, and means for controlling discharge from the hopper.

4. A storage unit comprising a storage container, a hopper therein above the bottom of the container and an open-ended shell therein, the shell terminating above the hopper, and supporting legs for the hopper and the shell within the container, leaving storage space within the container below the hopper between the legs.

5. A storage unit comprising a storage container, a hopper mounted therein above the bottom and below the top of the container, and a discharge means for taking off material from the hopper, the hopper being adapted to permit of material in the upper portion of the storage container flowing into the hopper and thence to the discharge means.

6. A storage unit comprising a storage container, a hopper mounted above the bottom and below the top of the container and adapted to permit of material in the upper portion of the storage container flowing thereinto, discharge means for taking off material from the hopper, and a live storage shell adapted to discharge into the hopper.

7. A storage unit comprising a storage container, a hopper mounted above the bottom and below the top of the container and adapted to permit of material in the upper portion of the storage container flowing thereinto, discharge means for taking off material from the hopper, and a live storage shell mounted above the hopper and adapted to supply material thereto.

8. A storage unit comprising a storage container, a hopper mounted above the bottom and below the top of the container and adapted to permit of material in the upper portion of the storage container flowing thereinto, discharge means for taking off material from the hopper, and a live storage shell mounted above the hopper and adapted to supply material thereto, the hopper and the shell being inside the storage container.

In testimony whereof I have hereunto set my hand.

CLARENCE O. BROWN.